Jan. 1, 1963 W. H. CONANT 3,071,046
EYELET REINFORCEMENT DEVICE
Filed April 5, 1960 3 Sheets-Sheet 3
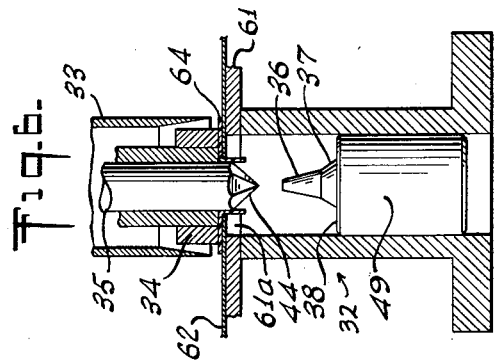
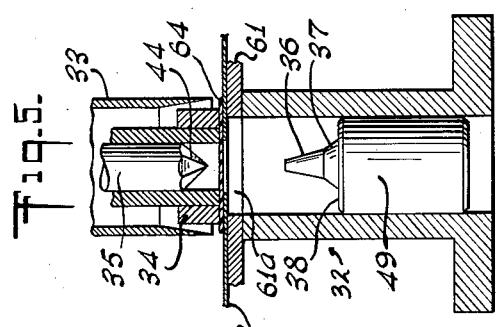
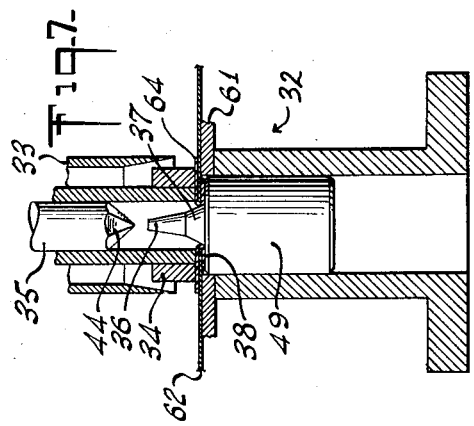
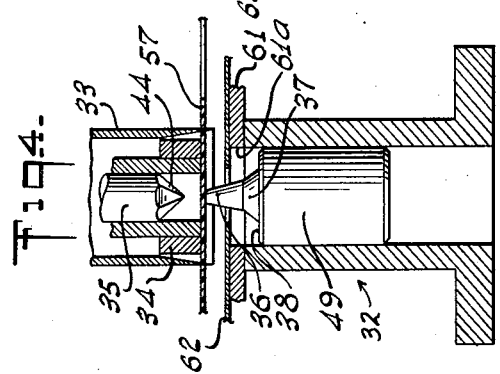
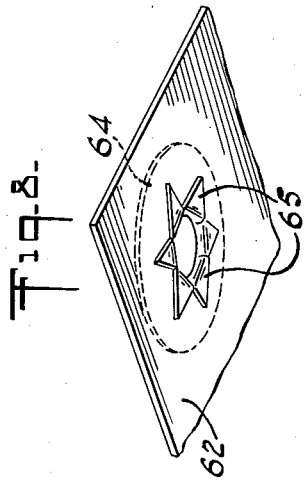
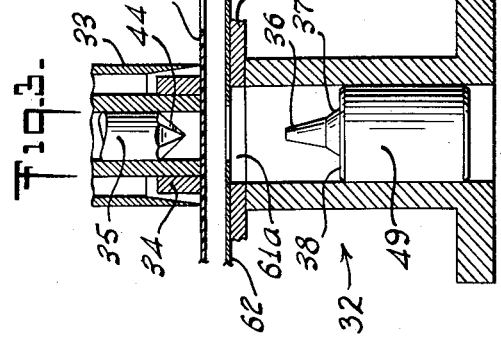
INVENTOR
WILLIAM H. CONANT
BY
Mitchell & Bechert
ATTORNEYS

United States Patent Office 3,071,046
Patented Jan. 1, 1963

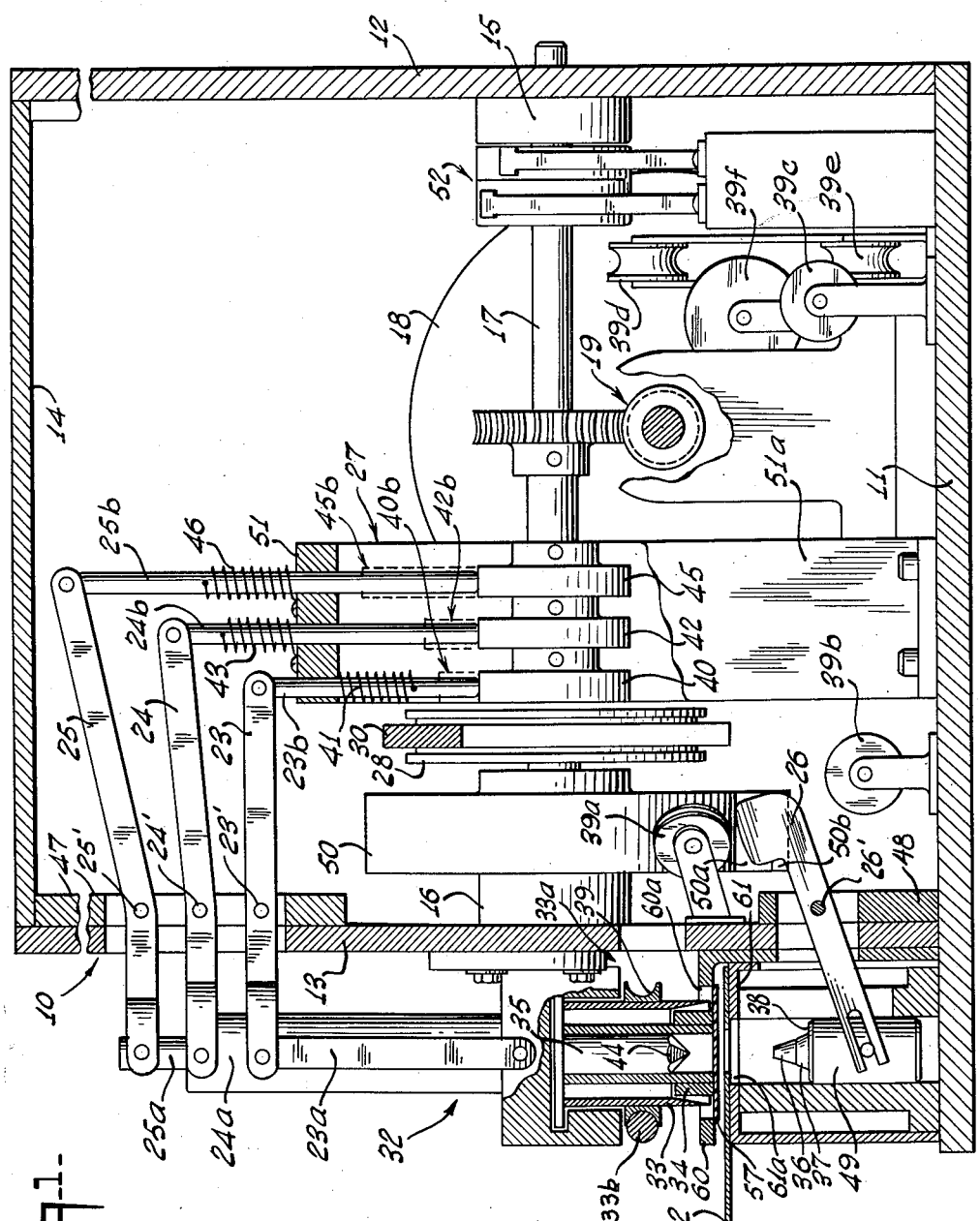

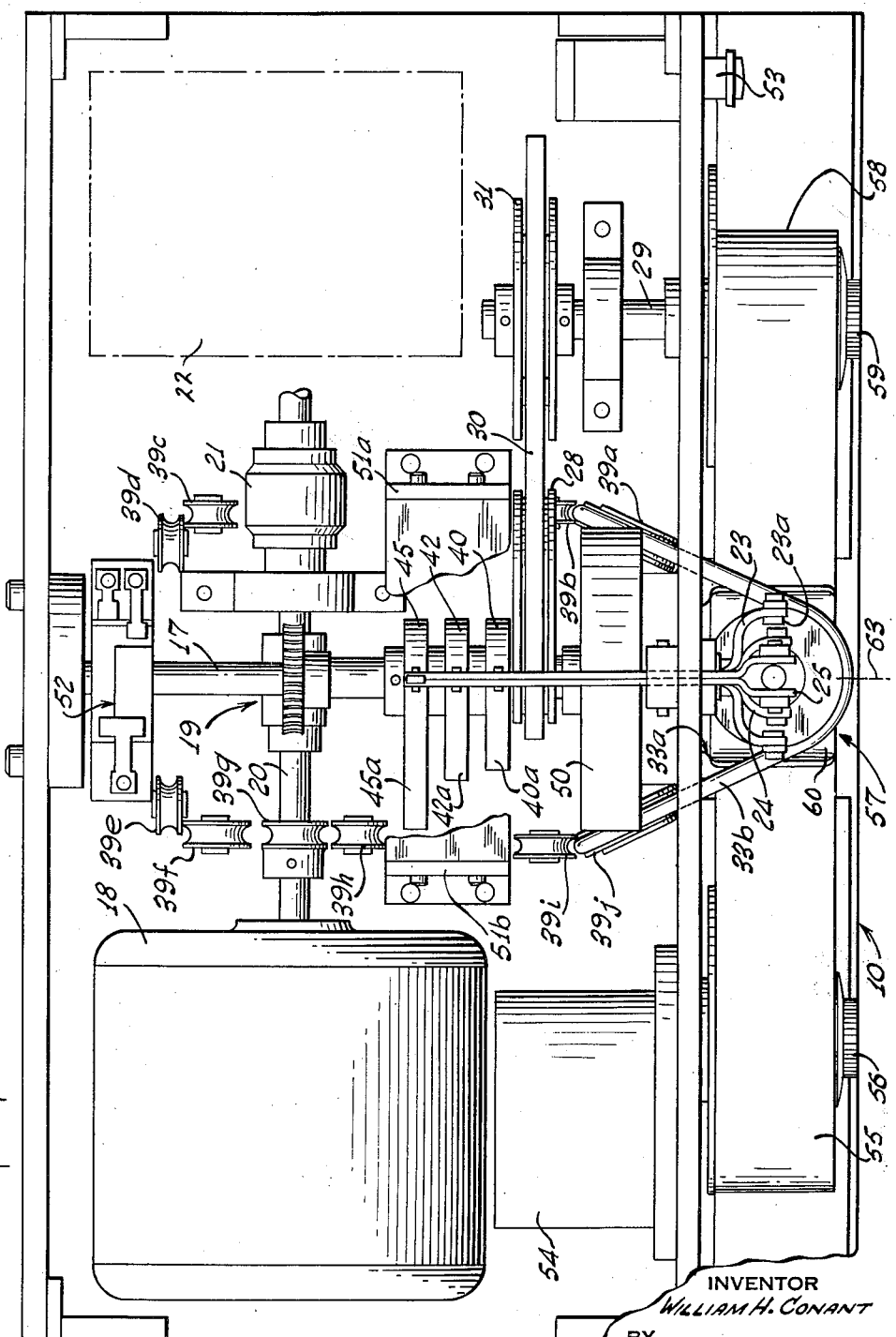

3,071,046
EYELET REINFORCEMENT DEVICE
William H. Conant, 140 E. Hartsdale Ave.,
Hartsdale, N.Y.
Filed Apr. 5, 1960, Ser. No. 20,056
9 Claims. (Cl. 93—1.1)

The present invention, generally, relates to a device to reinforce sheet material and, more particularly, to a device to reinforce sheet material about an aperture or eyelet therein.

It is an object of the present invention to provide a new and improved device to reinforce a sheet of material about an aperture therein.

Another object of the invention is to provide a device to reinforce a sheet of material automatically.

Still another object of the invention is to provide a device to cut a portion of reinforcement material from a supply thereof and to apply the cut portion about an aperture in a sheet of material.

Briefly, a device in accordance with the invention embodies a rotatable cutter to sever a portion from a strip or tape having pressure-sensitive adhesive on one side thereof. The severed tape portion then is pressed against a sheet of material to be reinforced; for example, over an aperture or eyelet adjacent an edge of the sheet. A plunger having one or more sharp edges is positioned to pierce and slit the tape portion radially and to push the slit parts thereof through the sheet. Also a suitable means is provided to press these parts against the opposite side of the sheet to complete the reinforcement around the aperture.

For a more complete understanding of the above and other objects and advantages of the invention, reference may be had to the description which follows and to the accompanying drawings, in which:

FIG. 1 is a side view in elevation, partly in cross section showing one relative arrangement of component parts in accordance with the principles of the invention;

FIG. 2 is a plan view of the arrangement shown in FIG. 1;

FIGS. 3 through 7 show the operations of the device of FIGS. 1 and 2 diagramatically in sequence; and FIG. 8 shows a sheet of material which has been reinforced about an aperture by the sequence of operations shown in FIGS. 3–7.

Referring now to the drawings, particularly to FIGS. 1 and 2, a preferred arrangement of the tape-eyelet device is indicated generally by the numeral 10. Although any suitable frame or base may be used to support the operating parts of the device, an adequate support is provided in this instance by a base 11 having fixed, spaced-apart sides 12 and 13 with a closure top 14.

A bearing or journal 15 is fixedly attached to the inside of the side 12, and a similar bearing or journal 16 is fixedly attached to the inside of the side 13 so that a shaft 17 is supported rotatably therebetween. Power is supplied to rotate the shaft 17 by a motor 18 and gears 19.

As best seen in FIG. 2 of the drawings, a shaft 20 of the motor 18 extends past the gears 19 and through a flexible coupling 21 to an electric brake 22. By this arrangement, instant starting and stopping of an operating cycle are obtained as will be understood.

Power from the shaft 17 is used to operate four levers 23, 24, 25 and 26 in a selected sequence by a plurality of cams indicated generally by the numeral 27. Another cam 28 also is connected to the shaft 17 and is used to drive another shaft 29 (FIG. 2) by means of a reciprocating arm 30 and a rotor 31. The purpose and use of the second shaft 29 will be described in greater detail presently.

The principal operating components of the tape-eyelet device 10 are indicated generally by the numeral 32 and consist primarily of a cylindrical or sleeve-like rotary cutter element 33; a cylindrical presser element 34 which is coaxial with the cutter 33; and a centrally disposed piercer element 35. The elements 33, 34 and 35 are operable by the levers 23, 24 and 25, respectively.

Also included with the principle operating components 32 is a prop or support element 36 which is narrow and elongated at the central portion thereof and is provided with a flared, frustro-conical lower portion 37. In addition, the support element 36 is provided with a substantially horizontal, annular, presser surface 38 adjacent the flared portion 37. The entire element 36 is attached to and is movable by the lever 26.

Referring now to each of the elements individually that make up the components 32, the cutter 33 is cylindrical and hollow and has a pulley 39 fixedly attached to the outer surface. By a series of specially arranged guide pulleys, the pulley 39 and, therefore, the rotary cutter 33 is rotated by the motor shaft 20 and a belt 33b. These guide pulleys are identified, respectively, by the numerals 39a through 39j.

Of course, rotation by the pulley 39 and the rotary cutter 33 can be obtained, if desired, by a suitable connection directly to the adjacent end of the shaft 17 by an appropriate rearrangement of the component parts. However, the arrangement illustrated is preferred in the present arrangement because of the greater speed of rotation that is obtainable for the cutter 33.

The rotary cutter 33 also is movable vertically (as viewed in FIG. 1) in suitable dovetail grooves 33a by means of the lever 23 and a coupling link 23a in response to the movement of a follower rod 23b. A cam 40 is fixedly attached to the shaft 17 and is provided with a lobe 40a (FIG. 2) to raise the follower rod 23b by an amount indicated by the dotted line 40b (FIG. 1). A coil spring 41 maintains the follower rod 23b in contact with the peripheral surface of the cam 40 during each complete cycle thereof.

The presser element 34 is cylindrical and fits within the inner surface of the rotary cutter element 33. In addition, the presser element 34 is movable vertically by the lever 24 and a coupling tube 24a. The lever 24 is operable through a follower rod 24b which follows the surface of a cam 42 having a lobe 42a sufficient to raise the rod 24b by an amount shown by a dotted line 42b. A coil spring 43 maintains the rod 24b in contact with the surface of the cam 42 during each complete operating cycle thereof.

The piercer element 35 is movable vertically along the inner central axis of the cutter element 33 and the presser element 34 by a follower rod 25b which couples the opposite end of the lever 25 to the surface of a cam 45. The follower rod 25b is movable vertically by a lobe 45a on the cam 45 and is raised by an amount indicated by the dotted line 45b (FIG. 1). A coil spring 46 maintains the follower rod 25b in contact with the surface of the cam 45 during one complete operating cycle thereof.

As seen in FIG. 1 of the drawings, each of the levers 23, 24 and 25 is pivotally attached at points 23', 24' and 25' to a member 47 fixed to the inner surface of the side 13.

The prop or support element 36 is movable vertically by means of the lever 26 which is pivotable about a point 26' on a member 48 which, in turn, is fixed to the inner surface of the side 13. The support element 36 is weighted, or biased, downwardly as viewed in FIG. 1 by means of a weight 49 attached thereto. However, it is understood that other means such as a coil spring may be used in lieu of the weight 49, if desired.

The lever 26 is movable by a cam 50 having two lobes thereon represented by the dotted lines 50a and 50b. In response to the action of the two lobes 50a and 50b, the support element 36 is movable vertically by a different distance two different times for each operating cycle as will be described in greater detail presently.

Each of the follower rods 23b, 24b and 25b is slidable through apertures in a beam 51 supported in a horizontal position by side members 51a and 51b. As best seen in FIG. 1, the coil spring 41 is operable in compression against the underside of the beam 51 whereas the two coil springs 43 and 46 are operable against the upper side of the beam 51. However, it is understood that other and different arrangements may be made for these coil springs, if desired.

Also operated from the shaft 17 is a rotary switch 52 which maintains operation of the electric motor 18 during one complete revolution of the shaft 17 when a start button 52 (FIG. 2) is closed. That is, when the start button 53 is pressed, the brake 22 is thereby released and the motor 18 turns for one complete revolution of the shaft 17. The switch 52 then opens the motor circuit and applies the brake terminating rotation automatically at the completion of one revolution.

As viewed in FIG. 2 a safety relay is identified by the numeral 54 and may, if desired, be used with the electrical circuit (not show) which governs the operation of the device 10.

As viewed also in FIG. 2, a reel 55 which is mounted rotatably on an axis 56 supports a roll of tape which has a suitable pressure-sensitive adhesive on one side thereof. The tape, indicated by the numeral 57 passes from the reel 55 to a take-up or rewind reel 58 mounted on an axis 59 which is integral with the shaft 29. Due to the presence of a pressure-sensitive adhesive on the tape 57, the reel 55 will turn only so long as the tape 57 is pulled by the reel 58, thus maintaining a taut stretch of tape at the region to be cut.

The cam 28 which is also operated by shaft 17 drives rotor 31 by means of arm 30 in successive rotating steps so as to cause rewind reel 58 by shaft 29 to accumulate the strip of tape remaining after discs have been cut from it. This remaining strip thus accumulated on a disposable core may then be removed as used typewriter ribbons are disposed.

As seen in FIGS. 1 and 2 of the drawings, surfaces 60 and 61 are spaced apart to guide the tape 57 solely on its non-adhesive side therebetween. Since the axis 56 and the axis 59 are raised above the surface 60, the tape 57 slides across the surface 60 leaving a space underneath to receive a sheet of material to be reinforced. Such a sheet is indicated by the numeral 62 in FIG. 1. The uppermost surface 60 is formed with an opening 60a to permit the cutter element 33 to pass therethrough. The lowermost surface 61 also has an opening 61a which is sufficiently large to permit the lower presser element 38 to pass readily therethrough.

If desired, suitable marks may be placed on the front of the device 10 such as at the central axis 63 (FIG. 2) to identify or aid in locating a sheet 62 to be reinforced.

In operation, refer to the diagrammatic view shown in FIG. 3 of the drawings wherein each of the component parts 32 is shown in its fully retracted position. With a sheet 62 in position to have an aperture or eyelet therein reinforced, the operative cycle of the device 10 may include, if desired, a first raising of the supporting element 36 to center the aperture in the sheet 62 accurately before the reinforcement operation.

Then with the element 36 raised sufficiently by one of the lobes on the cam 50 to support and prevent sagging at the center of the tape 57, the rotary cutter 33 is lowered, while rotating, to cut a cylindrical portion from the tape 57, see FIG. 4. If the tape 57 is permitted to sag, the cutter 33 may not cut a complete circle therefrom. Due to the relatively small area at the end of the support element 36, contact with the adhesive material on the lower surface of the tape 57 will be relatively small also.

With a circular portion cut from the tape 57, the support element 36 is retracted, and the presser element 34 is lowered to press the cut portion of the tape against the upper surface of the sheet 62, as seen in FIG. 5. Next, the piercer element 35 is lowered so that the edges 44 pierce the tape portion and sever it radially and, at the same time, bend the cut portion or burrs downwardly through the aperture or eyelet in the sheet 62 (FIG. 6).

The element 35, then, is retracted as seen in FIG. 7, and the support element 36 is raised by another of the lobes on the cam 50 so that the curved portion 37 thereof folds the burrs back along the underside of the sheet 62, and the flat portion 38 presses these burrs tightly against the underside of the sheet 62 to complete the reinforcement action.

The resultant reinforcement will appear as shown in FIG. 8 of the drawings with the dotted line 64 representing the circular portion cut from the tape and the burrs 65 are pressed against the underside of the sheet.

Of course, any suitable material may be used for the tape 57 such as fabric, plastic, etc., but the device 10 is particularly suitable to use a tape commonly known as "Scotch brand tape." Likewise, any suitable adhesive may be used from those referred to as "pressure-sensitive."

Although the structural arrangement just described above is one preferred embodiment, it is understood that modifications can be made within the basic inventive concept. For example, a tape having a dry adhesive on one side thereof may be used, and a moistened wiper may be positioned adjacent the rotatable cutter element to make the adhesive tacky just prior to affixing a cut portion thereof to a sheet to be reinforced.

Also within the basic inventive concept, modifications may be made in the arrangement illustrated herein to actuate the respective component elements shown in FIGS. 3–7. For example, the elongated support element 36 may be separate and independent from the annular presser surface 38, and these two separate parts may be actuated by independent cam means, or otherwise.

Further, all of the structure identified by the numeral 27 may be modified to actuate the basic components 32 by other and materially different arrangements. Still further, it will be understood by one skilled in the art to which the invention pertains that various other arrangements may be provided to rotate the rotary cutter element 33. The particular arrangement shown in the drawings, therefore, is for the purpose of illustrating the basic principles of the invention and the method by which those principles are carried out.

It will be understood therefore, that variations and modifications may be made in the particular arrangement described above and illustrated in the drawings by one skilled in the art without departing from the true spirit and scope of the invention as set forth in the claims appended hereto.

I claim:

1. A device to apply a reinforcement material about an aperture in a sheet comprising a rotatable cutter means, means to move said rotatable cutter means to cut a substantially circular portion from a strip of reinforcement material, presser means supported coaxially with said rotatable cutter means, means to move said presser means to press a cut portion of reinforcement material against a sheet to be reinforced, pointed means positioned coaxially with said presser means and said rotatable cutter means, said pointed means being reciprocable along its axis and having a body portion of cross-section substantially of the dimensions of said aperture, said body portion tapering at one longitudinal end to a sharp central point, means to move the pointed end of said pointed means to pierce said cut portion of reinforcement material, said last-defined means moving said pointed end through the aperture to the extent that said body portion fills said aperture, whereby pierced reinforcement material is locally stretched and severed generally radially to define slit parts and the slit parts are pushed through the aperture in the sheet to be reinforced, and means to turn and press the slit parts against the opposite side of said sheet.

2. A device to apply a reinforcement material to a sheet having an aperture therein, comprising a rotatable cutter means reciprocable along its axis to make a circular cut while rotating, annular presser means supported coaxial with said cutter means within the circumference of the cutting circle of said rotatable cutter means and reciprocable along said axis to press a cut circle of reinforcement material against the sheet and around the aperture, piercer means coaxial with and within said annular presser means and including a body portion of cross-section substantially that of the aperture, said body portion tapering at one end to a central piercing point and having a plurality of angularly spaced slitting edges extending radially from said point and along the taper of said body portion, power means to reciprocably move said rotatable cutter means and said presser means and said piercer means according to a preselected sequence, whereby a substantially circular portion is cut from said reinforcement material and pressed against a sheet to be reinforced, said cut portion being pierced and slit with the slit parts pressed through the aperture, and reciprocable means driven by said power means to turn and press the slit parts against the opposite side of said sheet.

3. A device to apply a reinforcement material about an aperture in a sheet as set forth in claim 2, including means to support a sheet to be reinforced while said rotatable cutter means is cutting a portion therefrom.

4. A device to apply a reinforcement material about an aperture in a sheet as set forth in claim 2, in which said power means includes a plurality of cam means driven in unison, and a plurality of linkages connecting representative ones of said cam means with respective ones of said parts to be operated in a pre-selected sequence.

5. A device to apply a reinforcement material about an aperture in a sheet as set forth in claim 2 including means to support a sheet in position to be reinforced, said support means having an opening therein, and movable support means to support said reinforcement material through said opening during the cutting of a portion therefrom.

6. A device to apply a reinforcement material about an aperture in a sheet comprising means to support a sheet to be reinforced, a first reel mounted rotatably on one side of said sheet support means to hold a supply of tape reinforcement material, a second reel mounted rotatably on the opposite side of said sheet support means to hold the offal of said tape reinforcement material, means to position a tape from said first reel above said sheet support means, said tape positioning means having an opening therethrough, a rotary cutter mounted to pass through said opening in said tape positioning means to sever a portion from a tape having a pressure-sensitive adhesive on one side thereof, an elongated member mounted below said sheet supporting means to be movable vertically to support the center of the tape portion being severed, substantially circular presser means positioned co-axially with said rotary cutter to press a severed tape portion against a sheet to be reinforced, a plurality of cutter edges extending radially and upwardly from a substantially common point, said cutter edges being formed on an element mounted co-axially with said presser means and said rotary cutter for vertical movement to pierce and slit the severed tape portion radially and bend the slit parts through the aperture in the sheet, said elongated member having a flared, frusto-conical lower portion to bend the slit parts back toward the underside of the sheet to be reinforced, an annular surface disposed about said flared, frusto-conical lower portion to press the slit parts firmly against the underside of the sheet to be reinforced, and power means to operate said cutter, presser means, elongated members and circular presser means in a predetermined sequence.

7. A device to apply a reinforcement material about a circular aperture in a sheet comprising means to support between longitudinally spaced locations a taut stretch of strip tape material having a smooth side and having a pressure-sensitive adhesive on the opposite side thereof, said stretch overstanding the apertured part of the sheet with the adhesive facing the sheet, a rotatable cutter means overstanding the aperture and of a diameter to circumferentially overlap the rim of the aperture, means to position a portion of said stretch of strip material against said rotatable cutter means so that a circular portion is cut therefrom when said cutter means is rotated, means to press said circular portion into adhesive contact with one side of the apertured sheet to be reinforced, pointed means positioned coaxially with said presser means and said rotatable cutter means, said pointer means being reciprocable along its axis and having a body portion of cross-section substantially of the dimensions of said aperture, said body portion tapering at one longitudinal end to a sharp central point, means to move the pointed end of said pointed means to pierce said cut portion of reinforcement material, said last-defined means moving said pointed end through the aperture to the extent that said body portion fills said aperture, whereby pierced reinforcement material is locally stretched and severed generally radially to define slit parts and the slit parts are pushed through the aperture in the sheet to be reinforced, and means to turn and press the slit parts against the opposite side of said sheet.

8. In combination, a sheet of paper or the like having an aperture to be reinforced, means supporting parallel to the apertured part of said sheet a taut stretch of strip tape material having one smooth side and having a pressure-sensitive adhesive on the side facing said sheet, a rotatable circular cutter of diameter exceeding the opening of said aperture and on an axis normal to said stretch at said aperture and facing the smooth side of said stretch, means to rotate said cutter and to advance the same on said axis to cut a circle of tape from said stretch, reciprocable means to press the cut circle of tape against said sheet at the apertured portion thereof, pointed means positioned coaxially with said presser means and said rotatable cutter means, said pointer means being reciprocable along its axis and having a body portion of cross-section substantially of the dimensions of said aperture, said body portion tapering at one longitudinal end to a sharp central point, means to move the pointed end of said pointed means to pierce said cut portion of reinforcement material, said last-defined means moving said pointed end through the aperture to the extent that said body portion fills said aperture, whereby pierced reinforcement material is locally stretched and severed generally radially to define slit parts and the slit parts are pushed through the aperture in the sheet to be reinforced, and means to turn and press the slit parts against the opposite side of said sheet.

9. A device to apply a reinforcement material to a sheet having an aperture therein, said reinforcement material being elongated flexible tape with pressure-sensitive adhesive on one to the exclusion of the other side thereof, comprising means supporting one side of said sheet in the region of the aperture, cutter means for cutting from said tape a portion more than adequate to peripherally continuously overlap the border of the aperture, reciprocable presser means on the unsupported side of said sheet to press the adhesive side of the cut portion of tape against the unsupported side of said sheet in peripherally continuous overlapping relation with the border of the aperture, piercer means guided within said presser means and reciprocable normal to the support plane of the sheet in alignment with the aperture, said piercer means including a body portion of cross-section substantially conforming to the contour of the aperture, said body portion tapering at one end to a central piercing point and having plural angularly spaced slitting edges radiating from said point and along the taper of said body portion, power means to reciprocably move said presser means and said piercer means according to a preselected sequence involving full entry of the tapered part of said piercer means through the tape-covered aperture, whereby the cut portion of tape is pressed against the sheet to be reinforced and the cut portion is pierced and slitted with the slit parts being pressed through the aperture, and reciprocable means driven by said power means and approaching the opposite side of the sheet in intercepting relation with the slit parts to turn and press the slit parts against the opposite side of the sheet.

References Cited in the file of this patent

UNITED STATES PATENTS

| | | |
|---|---|---|
| 1,202,123 | Swift | Oct. 24, 1916 |
| 1,565,523 | Stuart | Dec. 15, 1925 |
| 2,333,966 | Weiss | Nov. 9, 1943 |
| 2,482,030 | Roberts | Sept. 13, 1949 |
| 2,627,212 | Connor et al. | Feb. 3, 1953 |
| 2,690,101 | Hirson | Sept. 28, 1954 |
| 2,867,155 | Herrmann | Jan. 6, 1959 |